US012643796B2

(12) United States Patent
Zones

(10) Patent No.: US 12,643,796 B2
(45) Date of Patent: Jun. 2, 2026

(54) MOLECULAR SIEVE SSZ-113 WITH HIGH ACIDITY, ITS SYNTHESIS AND USE

(71) Applicant: Chevron U.S.A. Inc., San Ramon, CA (US)

(72) Inventor: Stacey I. Zones, San Francisco, CA (US)

(73) Assignee: Chevron U.S.A. Inc.

( * ) Notice: Subject to any disclaimer, the term of this patent is extended or adjusted under 35 U.S.C. 154(b) by 419 days.

(21) Appl. No.: 18/325,246

(22) Filed: May 30, 2023

(65) Prior Publication Data

US 2023/0382745 A1 Nov. 30, 2023

Related U.S. Application Data

(60) Provisional application No. 63/365,515, filed on May 31, 2022.

(51) Int. Cl.

*C01B 33/26* (2006.01)
*B01J 29/08* (2006.01)
*B01J 37/08* (2006.01)
*C10G 35/095* (2006.01)

(52) U.S. Cl.

CPC ......... *C01B 33/2853* (2013.01); *B01J 29/084* (2013.01); *B01J 37/08* (2013.01); *C10G 35/095* (2013.01); *C01P 2002/72* (2013.01); *C10G 2300/70* (2013.01)

(58) Field of Classification Search

CPC ..... C01B 33/2853; B01J 29/084; B01J 37/08; C10G 35/095

See application file for complete search history.

(56) References Cited

U.S. PATENT DOCUMENTS

| | | | |
|---|---|---|---|
| 10,384,951 B1 * | 8/2019 | Zones ...................... B01J 29/70 |
| 11,161,750 B1 | 11/2021 | Zones |
| 2005/0194289 A1 | 9/2005 | Overbeek et al. |
| 2006/0115417 A1 | 6/2006 | Yuen et al. |
| 2008/0058196 A1 | 3/2008 | Zones et al. |
| 2011/0318263 A1 | 12/2011 | Zones et al. |
| 2015/0011787 A1 | 1/2015 | Bellussi et al. |
| 2017/0128923 A1 | 5/2017 | Yang et al. |
| 2019/0256364 A1 | 8/2019 | Zones et al. |
| 2019/0375648 A1 | 12/2019 | Xie et al. |
| 2021/0221696 A1 | 7/2021 | Zones et al. |
| 2022/0072520 A1 | 3/2022 | Zones et al. |

FOREIGN PATENT DOCUMENTS

| | | |
|---|---|---|
| CN | 113343948 A | 9/2021 |
| WO | 2021082140 A1 | 5/2021 |

OTHER PUBLICATIONS

Chen, Reforming with novel bororsilicate molecular sieve catalyst, 1997, Mat. Res. Soc. Symp. Proc, 454, 205-215.*
International Search Report and Written Opinion from PCT/US2023/067600 mailed Oct. 4, 2023.

* cited by examiner

*Primary Examiner* — James A Fiorito
(74) *Attorney, Agent, or Firm* — Erich Joseph Gess; Melissa M. Hayworth; Terrence Michael Flaherty

(57) ABSTRACT

A novel synthetic crystalline molecular sieve material, designated SSZ-113 is provided which exhibits increased acidity. The SSZ-113 can be synthesized using 1,3-bis(2,3-dimethyl-1H-imidazolium)propane dications as a structure directing agent. The synthesis employs a boron pathway to achieve increased acid sites. The SSZ-113 of increased acidity may be used in organic compound conversion and/or sorptive processes.

8 Claims, No Drawings

MOLECULAR SIEVE SSZ-113 WITH HIGH ACIDITY, ITS SYNTHESIS AND USE

CROSS REFERENCE TO RELATED APPLICATIONS

The present application claims priority to U.S. Provisional Application No. 63/365,515, filed May 31, 2022, the complete disclosure of which is incorporated herein by reference in its entirety.

FIELD

This disclosure relates to a novel synthetic crystalline molecular sieve, designated SSZ-113 having increased acidity, and its synthesis.

BACKGROUND

Zeolitic materials are known to have utility as sorbents and to have catalytic properties for various types of organic compound conversion reactions. Certain zeolitic materials are ordered, porous crystalline materials having a definite crystalline structure as determined by X-ray diffraction, within which there are a large number of smaller cavities which may be interconnected by a number of still smaller channels or pores. These cavities and pores are uniform in size within a specific zeolitic material. Since the dimensions of these pores are such as to accept for sorption molecules of certain dimensions while rejecting those of larger dimensions, these materials have come to be known as "molecular sieves" and are utilized in a variety of ways to take advantage of these properties.

There are currently over 250 known zeolitic framework structures recognized by the International Zeolite Association. There exists a need for new structures, having different properties than those of known materials, for improving the performance of many organic compound conversion and sorption processes. Each structure has unique pore, channel and cage dimensions, which gives its particular properties as described above. Each structure also has a particular composition. Improvements in preparing more pure, single phase materials are always important. Providing molecular sieves with increased acid sites can be valuable with regard to the catalysis in organic compound conversion reactions.

SUMMARY

According to the present disclosure, a novel molecular sieve structure, designated SSZ-113 with increased acid sites, has been synthesized using 1,3-bis(2,3-dimethyl-1H-imidazolium)propane dications as a structure directing agent. The synthesis is conducted through a boron pathway. The final molecular sieve contains some boron in its framework.

In one embodiment, the amount of boron can range from 50-250 ppm.

The present aluminogermanosilicate SSZ-113 molecular sieve having increased acid sites, and hence enhanced acidity, can have a chemical composition comprising the following molar relationship:

$$(SiO_2+GeO_2)/Al_2O_3 \geq 20.$$

The SSZ-113 molecular sieve prepared also has increased acid sites and some boron in the framework.

The boron pathway involves preparing a boron SSZ-113 molecular sieve. It is this borongermanosilicate molecular sieve that is then treated to replace boron in the framework with aluminum, hence resulting in a SSZ-113 molecular sieve with increased acid sites.

In another embodiment, there is provided a method of synthesizing the molecular sieve described herein having enhanced acidity, the method comprising (a) providing a reaction mixture comprising: (1) a source of germanium oxide; (2) a source of silicon oxide; (3) a source of boron; (4) a source of 1,3-bis(2,3-dimethyl-1H-imidazolium)propane dications; (5) a source of fluoride ions; and (6) water; and (b) subjecting the reaction mixture to crystallization conditions sufficient to form crystals of a boron molecular sieve. The boron containing SSZ-113 molecular sieve is then treated to remove the SDA, followed by a treatment to replace some or all of the boron with aluminum. The result is a SSZ-113 with increased acid sites.

In yet a further aspect, there is provided a process of converting a feedstock comprising an organic compound to a conversion product which comprises contacting the feedstock at organic compound conversion conditions with a catalyst comprising an active form of the SSZ-113 molecular sieve having increased acid sites described herein.

Among other factors, the present process allows one to obtain a SSZ-113 molecular sieve with increased acid sites, i.e., the SSZ-113 is acid rich or of enhanced acidity. By increased acid sites is meant that by using the present process with its boron pathway, a SSZ-113 molecular sieve can be obtained with more acid sites than would be possible by preparing the molecular sieve conventionally in a straight forward method with aluminum sites and no boron sites. When the conventional route is employed, it has been found that some amorphous phase occurs so a loss of Al acid sites is experienced. It has been found, quite surprisingly, that by first inserting boron in the framework, and then replacing the boron with aluminum, a SSZ-113 molecular sieve having a comparatively enhanced number of acid sites can be achieved. The increased acid sites can result in improved catalytic characteristics for the present SSZ-113 molecular sieve. The present SSZ-113 molecular sieve also contains some boron.

DETAILED DESCRIPTION

Introduction

The term "aluminogermanosilicate" refers to a crystalline microporous solid including aluminum, germanium and silicon oxides within its framework. In some cases, one or more of these oxides may be substituted with other oxides.

The term "as-synthesized" is employed herein to refer to a molecular sieve in its form after crystallization, prior to removal of the organic structure directing agent.

The term "anhydrous" is employed herein to refer to a molecular sieve substantially devoid of both physically adsorbed and chemically adsorbed water.

As used herein, the numbering scheme for the Periodic Table Groups is as disclosed in *Chem. Eng. News* 1985, 63(5), 26-27.

By "increased," or "more," acid sites is meant that the SSZ-113 molecular sieve prepared by the present process comprises more acid sites than would be possible by preparing the molecular sieve conventionally, without employing the present boron pathway. When the conventional, straight forward method with aluminum is employed, it has been discovered that an amorphous phase occurs which causes a loss of Al acid sites. It has been found, quite surprisingly, that by first inserting boron in the SSZ-113 framework, and then replacing the boron with aluminum, a SSZ-113-molecular sieve having comparatively more aluminum acid sites is obtained than would be obtained if the boron were not introduced in the initial preparation of the molecular sieve. Thus, the SSZ-113 is acid rich or of enhanced acidity. This increased acidity can impact, improve, the catalytic characteristics of the molecular sieve. The molecular sieve would be quite useful, e.g., in converting a feedstock comprising an organic compound to a conversion product. Due to the boron pathway, some boron does remain in the SSZ-113 molecular sieve.

Reaction Mixture Used in Synthesis of Molecular Sieve

The present aluminogermanosilicate molecular sieve SSZ-113 can be synthesized through a boron pathway by: (a) providing a reaction mixture comprising (1) a source of germanium oxide; (2) a source of silicon oxide; (3) a source of boron; (4) a source of 1,3-bis(2,3-dimethyl-1H-imidazolium)propane dications (Q); (5) a source of fluoride ions; and (6) water; and (b) subjecting the reaction mixture to crystallization conditions sufficient to form crystals of the molecular sieve. The SDA can then be removed by either calcination or ozone treatment. The crystals of the calcined molecular sieve, which has boron in the framework, is then treated to replace at least most of the boron sites with aluminum to thereby provide a SSZ-113 molecular sieve with increased acid sites. Some boron will remain in the molecular sieve. The amount is generally in the range of from 50-250 ppm.

The reaction mixture to form the boron SSZ-113 molecular sieve can have a composition, in terms of molar ratios, within the following ranges:

TABLE 1

| Reactants | Broad | Exemplary |
|---|---|---|
| $(SiO_2 + GeO_2)/B_2O_3$ | ≥10 | 15 to 20 |
| $Q/(SiO_2 + GeO_2)$ | 0.05 to 0.50 | 0.05 to 0.50 |
| $F/(SiO_2 + GeO_2)$ | 0.10 to 1.00 | 0.15 to 0.50 |
| $H_2O/(SiO_2 + GeO_2 + B_2O_3)$ | 3 to 8 | 4 to 6 |

Suitable sources of germanium oxide include germanium oxide, germanium alkoxides (e.g., germanium ethoxide), germanium hydroxides, and germanium carboxylates.

Suitable sources of silicon oxide include colloidal silica, fumed silica, precipitated silica, alkali metal silicates and tetraalkyl orthosilicates. A FAU framework type zeolite can also provide silicon oxide, e.g., such as zeolite Y. The FAU zeolite will exhibit a $SiO_2/Al_2O_3$ mol ratio of at least 250, and in one embodiment at least 300, or a mol ratio in the range of 300-500.

The molar ratio of Si:Ge may be at least 1:1 (e.g., in a range of 2:1 to 500:1 or even in a range of 5:1 to 100:1). In one embodiment, the ratio can range from 4 to 12, e.g., 6 to 10.

Suitable sources of boron can include boric acid, which is preferred.

Combined sources of silicon oxide and aluminum oxide can additionally or alternatively be used and can include aluminosilicate zeolites (e.g., zeolite Y) and clays or treated clays (e.g., metakaolin).

Conveniently, Q comprises 1,3-bis(2,3-dimethyl-1H-imidazolium)propane dications, represented by the following structure (1):

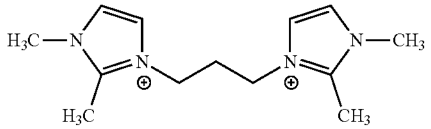
(1)

The above diquaternary ammonium compound can be readily synthesized by a reaction of a 1,3-dihalopropane (e.g., 1,3-dibromopropane or 1,3-diiodopropane) with 1,2-dimethylimidazole by methods known in the art (see, e.g., S. I. Zones et al., *J. Mater. Chem.* 2005, 15, 4215-4223).

Suitable sources of Q are the hydroxides and/or other salts of the diquaternary ammonium compound, or a mixture thereof.

Suitable sources of fluoride ions include hydrogen fluoride, ammonium fluoride and ammonium hydrogen difluoride.

The reaction mixture may contain seeds of a boron SSZ-113 molecular sieve material, such as boron SSZ-113 from a previous synthesis, in an amount of from 0.01 to 10,000 ppm by weight (e.g., 100 to 5000 ppm by weight) of the reaction mixture. Seeding can be advantageous in decreasing the amount of time necessary for complete crystallization to occur. In addition, seeding can lead to an increased purity of the product obtained by promoting the nucleation and/or formation of boron SSZ-113 over any undesired phases.

For each embodiment described herein, the molecular sieve reaction mixture can be supplied by more than one source. Also, two or more reaction components can be provided by one source.

The reaction mixture can be prepared either batch wise or continuously. Crystal size, morphology and crystallization time of the molecular sieve described herein can vary with the nature of the reaction mixture and the crystallization conditions.

Crystallization and Post-Synthesis Treatment

Consistent with the boron pathway, crystallization of the molecular sieve from the above reaction mixture can be carried out under either static, tumbled or stirred conditions in a suitable reactor vessel, such as polypropylene jars or Teflon-lined or stainless-steel autoclaves, at a temperature of from 125° C. to 200° C. for a time sufficient for crystallization to occur at the temperature used, e.g., from 2 to 20 days. Crystallization is usually carried out in a closed system under autogenous pressure.

Once the molecular sieve crystals containing boron have formed, the solid product is recovered from the reaction mixture by standard mechanical separation techniques such as centrifugation or filtration. The crystals are water-washed and then dried to obtain the as-synthesized molecular sieve crystals. The drying step is typically performed at a temperature of less than 200° C.

As a result of the crystallization process, the recovered crystalline molecular sieve product contains within its pore structure at least a portion of the organic structure directing agent used in the synthesis. The molecular sieve described herein may be subjected to subsequent treatment to remove part or all of the structure directing agent (Q) used in its synthesis.

Removal of the structure directing agent can be conveniently effected by thermal treatment in which the as-synthesized material can be heated at a temperature of at least 370° C. for at least 1 minute and not longer than 24 hours. The thermal treatment can be performed at a temperature up to 925° C. While sub-atmospheric and/or super-atmospheric pressures can be employed for the thermal treatment, atmospheric pressure may typically be desired for reasons of convenience.

Additionally, or alternatively, the organic structure directing agent can be removed by treatment with ozone (see, e.g., A. N. Parikh et al., *Micropor. Mesopor. Mater.* 2004, 76, 17-22). In one embodiment, the treatment with ozone is preferred in that it can provide a higher micropore volume.

The boron SSZ-113 molecular sieve crystals can then be treated to replace at least some of the boron, although preferably most (90%) if not nearly all of the boron, with aluminum. In one embodiment, the amount of boron remaining after the exchange can be in an amount ranging from 50 to 250 ppm. Conventional techniques can be used, e.g., by ion exchange. However, treating the molecular sieve with aqueous aluminum nitrate is a preferred manner of replacing the boron in the framework with aluminum. The treatment can be accomplished by contacting the molecular sieve with an aluminum nitrate solution under reflux.

The SSZ-113 molecular sieve with increased acid sites, especially in its metal, hydrogen and ammonium forms, is particularly useful in the catalysis of certain organic (e.g., hydrocarbon) conversion reactions. In the present disclosure, the organic-free molecular sieve in its hydrogen form is referred to as "active form" of the molecular sieve, with or without metal function present.

Characterization of the Molecular Sieve

The final acid enhanced molecular sieve SSZ-113 can have a chemical composition comprising the following molar relationship:

TABLE 2

| | Broad | Exemplary |
|---|---|---|
| $(SiO_2 + GeO_2)/Al_2O_3$ | ≥20 | 20 to 600 |

The present molecular sieve SSZ-113 exhibits its characteristic XRD pattern, but it also has increased acid sites. Some residual boron also remains in the structure. In one aspect, the present molecular sieve has a composition comprising the molar relationship:

$$Al_2O_3:(n)(SiO_2+GeO_2)$$

where n is ≥20. In one embodiment, n in the foregoing relationship ranges from 20 to 600.

The high acidity SSZ-113 molecular sieve obtained after the aluminum exchange procedure will have a powder XRD pattern including at least the peaks of Table 3, but with the molecular sieve also comprising some boron and enhanced acidity.

TABLE 3

Characteristic Peaks for Acid Enhanced SSZ-113

| 2-Theta[a] | d-Spacing, nm | Relative Intensity[b] |
|---|---|---|
| 7.80 | 1.133 | W |
| 9.02 | 0.979 | VS |
| 9.78 | 0.904 | M |
| 15.69 | 0.564 | S |
| 16.72 | 0.530 | W |
| 18.28 | 0.485 | VS |
| 21.04 | 0.422 | W |
| 23.53 | 0.378 | M |
| 26.22 | 0.340 | VS |
| 27.36 | 0.326 | W |

[a] ±0.30 degrees

[b] The powder XRD patterns provided are based on a relative intensity scale in which the strongest line in the X-ray pattern is assigned a value of 100: W = weak (>0 to ≤20); M = medium (>20 to ≤40); S = strong (>40 to ≤60); VS = very strong (>60 to ≤100).

As will be understood by those of skill in the art, the determination of the parameter 2-theta (2θ) is subject to both human and mechanical error, which in combination can impose an uncertainty of about ±0.30° on each reported value of 2-theta. The relative intensity ($100\times I/I_o$) is recorded as the ratio of the peak intensity to that of the most intense peak, which is assigned a value of 100. The relative intensities of the cl-spacings are indicated by the notations VS, S, M, and W which represent very strong, strong, medium, and weak, respectively. In terms of relative intensity, the above designations are defined as: W (weak)<20; M (medium) is >20 and <40; S (strong) is 40 and <60; and VS (very strong) is 60. When the intensity is near the endpoint for a range, the intensity may be characterized as being in either of the ranges. For example, intensities of 18-22 may be listed as W-M. However, due to variations in intensity of the lines, as known in the art, one or more of the lines may have an intensity that is in an adjacent range.

The powder X-ray diffraction patterns presented herein were collected by standard techniques. The radiation was CuKα radiation. The peak heights and the positions, as a function of 2θ where θ is the Bragg angle, were read from the relative intensities of the peaks (adjusting for background), and d, the interplanar spacing corresponding to the recorded lines, can be calculated.

Minor variations in the diffraction pattern can result from variations in the mole ratios of the framework species of the sample due to changes in lattice constants. In addition, disordered materials and/or sufficiently small crystals will affect the shape and intensity of peaks, leading to significant peak broadening. Minor variations in the diffraction pattern can also result from variations in the organic compound used in the preparation. Calcination can also cause minor shifts in the XRD pattern. Notwithstanding these minor perturbations, the basic crystal lattice structure remains unchanged.

The increased acidity of the molecular sieve can be measured, for example, by measuring its Bronsted acidity.

Sorption and Catalysis

Molecular sieve SSZ-113 with increased acid sites can be used as a sorbent or as a catalyst to catalyze a wide variety of organic compound conversion processes including many of present commercial/industrial importance. Examples of chemical conversion processes which are effectively catalyzed by the acid rich SSZ-113, by itself or in combination with one or more other catalytically active substances including other crystalline catalysts and functional metals, include those requiring a catalyst with acid activity, or a catalytic metal. Examples of organic conversion processes which may be catalyzed by the acid rich SSZ-113 can include, for example, cracking, hydrocracking, disproportionation, alkylation, oligomerization, and isomerization.

As in the case of many catalysts, it may be desirable to incorporate the SSZ-113 with increased acid sites with another material resistant to the temperatures and other conditions employed in organic conversion processes. Such materials can include active and inactive materials and synthetic or naturally occurring zeolites as well as inorganic materials such as clays, silica and/or metal oxides such as alumina. The latter may be either naturally occurring, or in the form of gelatinous precipitates or gels, including mixtures of silica and metal oxides. Use of a material in conjunction with the acid rich SSZ-113 (i.e., combined therewith or present during synthesis of the new material) which is active, can tend to change the conversion and/or selectivity of the catalyst in certain organic conversion processes. Inactive materials can suitably serve as diluents to control the amount of conversion in a given process so that products can be obtained in an economic and orderly manner without employing other means for controlling the rate of reaction. These materials may be incorporated into naturally occurring clays (e.g., bentonite and kaolin) to improve the crush strength of the catalyst under commercial operating conditions. These materials (i.e., clays, oxides, etc.) can function as binders for the catalyst. It can be desirable to provide a catalyst having good crush strength because in commercial use it can be desirable to prevent the catalyst from breaking down into powder-like materials (fines). These clay and/or oxide binders have been employed normally only for the purpose of improving the crush strength of the catalyst.

Naturally occurring clays which can be composited with the acid rich SSZ-113 include the montmorillonite and kaolin family, which families include the sub-bentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or initially subjected to calcination, acid treatment or chemical modification. Binders useful for compositing with the acid rich SSZ-113 can additionally or alternatively include inorganic oxides, such as silica, zirconia, titania, magnesia, beryllia, alumina, and mixtures thereof.

Additionally or alternatively to the foregoing materials, the acid rich SSZ-113 can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia silica-alumina-magnesia and silica-magnesia-zirconia.

The relative proportions of the SSZ-113 with increased acid sites and inorganic oxide matrix may vary widely, with the SSZ-113 content ranging from 1 to 90 wt. % (e.g., 2 to 80 wt. %) of the composite.

EXAMPLES

The following illustrative examples are intended to be non-limiting.

Example 1

Into a tared 23 ml reactor Teflon cup, 5 m moles of the SDA 1,3-bis(2,3-dimethyl-1H-imidazolium) propane dihydroxide solution are added. Then 0.54 grams of Tosoh HUA-390 FAU zeolite (SAR ~500),0.10 grams of $GeO_2$ and 0.06 grams for $H_3BO_3$ (boric acid) are added to the cup. After several days of evaporation in the hood to reduce the $H_2O/TO_2$ ratio down to 7, the reaction is given 0.20 grams 50% HF and then sealed up and heated at 160° C. for 7 days with rotation of 43 RPM. Upon cooling and collecting a sample from filtration and washing, the XRD data is shown to be for SSZ-113.

The as-made Borongermanosilicate SSZ-113 can then be calcined to 540° C. in air using a ramp program of 1° C. to 120° C./min., hold for 2 hours/1° C./min. to 540° C./hold for 4 hours and cool in an oven.

The XRD pattern is essentially unchanged.

An Al for B treatment is then carried out. 0.26 grams of the calcined Boron SSZ-113 is placed in a glass vial with 10 ml of water and then 0.30 grams of aluminum nitrate (nine hydrate) is heated. The vial is closed and heated static at 95° C. for 2 days. Upon cooling filtration is then followed by a pH=2 wash of HCL before distilled water. The following table shows the change in elemental analysis before and after calcination and the aluminum nitrate treatment:

| | As-made SSZ-113 | After calcination and treatment with Al |
|---|---|---|
| Al | none | 1.04 wt % |
| Boron | 0.46 wt % | 243 ppm |
| Germanium | 9.77 wt % | 3.67 wt % |
| Silicon | 31.2 wt % | 37.7 wt % |

Example 2

The now treated Al for B SSZ-113 of Example 1 is measured for acidity. Brønsted acidity was determined by n-propylamine temperature-programmed desorption (TPD) adapted from the published descriptions by T. J. Gricus Kofke et al. (J. Catal. 1988, 114, 34-45); T. J. Gricus Kofke et al. (J. Catal. 1989, 115, 265-272); and J. G. Tittensor et al. (J. Catal. 1992, 138, 714-720). A sample was pre-treated at 400° C.-500° C. for 1 hour in flowing dry $H_2$. The dehydrated sample was then cooled down to 120° C. in flowing dry helium and held at 120° C. for 30 minutes in a flowing helium saturated with n-propylamine for adsorption. The n-propylamine-saturated sample was then heated up to 500° C. at a rate of 10° C./minute in flowing dry helium. The Brønsted acidity was calculated based on the weight loss vs. temperature by thermogravimetric analysis (TGA) and effluent NH3 and propene by mass spectrometry. The material is found to have strong acid sites. The desorption data for the peak near 400° C. translates into a measured value of 200 micromoles of amine per gram.

As used in this disclosure the word "comprises" or "comprising" is intended as an open-ended transition meaning the inclusion of the named elements, but not necessarily excluding other unnamed elements. The phrase "consists essentially of" or "consisting essentially of" is intended to mean the exclusion of other elements of any essential significance to the composition. The phrase "consisting of" or "consists of" is intended as a transition meaning the exclusion of all but the recited elements with the exception of only minor traces of impurities.

All patents and publications referenced herein are hereby incorporated by reference to the extent not inconsistent herewith. It will be understood that certain of the above-described structures, functions, and operations of the above-described embodiments are not necessary to practice the present invention and are included in the description simply for completeness of an exemplary embodiment or embodiments. In addition, it will be understood that specific structures, functions, and operations set forth in the above-described referenced patents and publications can be practiced in conjunction with the present invention, but they are not essential to its practice. It is therefore to be understood that the invention may be practiced otherwise that as specifically described without actually departing from the spirit and scope of the present invention as defined by the appended claims.

The invention claimed is:

1. A method of synthesizing a molecular sieve having an X-ray diffraction pattern including the peaks listed in the following table:

| 2-Theta | d-Spacing, nm | Relative Intensity |
|---|---|---|
| 7.80 ± 0.30 | 1.133 | W |
| 9.02 ± 0.30 | 0.979 | VS |
| 9.78 ± 0.30 | 0.904 | M |
| 15.69 ± 0.30 | 0.564 | S |
| 16.72 ± 0.30 | 0.530 | W |
| 18.28 ± 0.30 | 0.485 | VS |
| 21.04 ± 0.30 | 0.422 | W |
| 23.53 ± 0.30 | 0.378 | M |
| 26.22 ± 0.30 | 0.340 | VS |
| 27.36 ± 0.30 | 0.326 | W |

and with the molecular sieve comprising boron and having increased acid sites, the method comprising:

(a) providing a reaction mixture comprising:

(1) a source of germanium oxide;

(2) a source of silicon oxide;

(3) a source of boron;

(4) a source of 1,3-bis(2,3-dimethyl-1H-imidazolium) propane dications (Q);

(5) a source of fluoride ions; and (6) water;

(b) subjecting the reaction mixture to crystallization conditions sufficient to form crystals of the molecular sieve which contains boron;

(c) removing at least some Q; and (d) replacing some of the boron in the molecular sieve crystals from (c) with aluminum.

2. The method of claim 1, wherein the reaction mixture has a composition, in terms of molar ratios, as follows:

| | |
|---|---|
| $(SiO_2 + GeO_2)/B_2O_3$ | ≥10 |
| $Q/(SiO_2 + GeO_2)$ | 0.05 to 0.50 |
| $F/(SiO_2 + GeO_2)$ | 0.10 to 1.00 |
| $H_2O/(SiO_2 + GeO_2 + B_2O_3)$ | 3 to 8. |

3. The method of claim 1, wherein the reaction mixture has a composition, in terms of molar ratios, as follows:

| | |
|---|---|
| $(SiO_2 + GeO_2)/B_2O_3$ | 15 to 20 |
| $Q/(SiO_2 + GeO_2)$ | 0.05 to 0.50 |
| $F/(SiO_2 + GeO_2)$ | 0.15 to 0.50 |
| $H_2O/(SiO_2 + GeO_2 + B_2O_3)$ | 4 to 6. |

4. The method of claim 1, wherein the source of silicon oxide comprises zeolite Y, having a $SiO_2/Al_2O_3$ ratio of at least 300.

5. The method of claim 1, wherein the crystallization conditions include a temperature of from 125° C. to 200° C.

6. The process of claim 1, wherein the Q is removed by calcination.

7. The process of claim 1, wherein the Q is removed by treatment with ozone.

8. The process of claim 1, wherein the replacing of boron with aluminum comprises refluxing the molecular sieve crystals with a solution of aluminum nitrate.

* * * * *